United States Patent
Liu et al.

(10) Patent No.: US 11,234,311 B2
(45) Date of Patent: Jan. 25, 2022

(54) LOW STANDBY POWER SMART BULB BASED ON A LINEAR POWER SUPPLY

(71) Applicant: LEDVANCE LLC, Wilmington, MA (US)

(72) Inventors: Yuhao Liu, Medford, MA (US); Nilesh Patel, East Windsor, NJ (US); Ming Li, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 17/066,579

(22) Filed: Oct. 9, 2020

(65) Prior Publication Data
US 2021/0037629 A1    Feb. 4, 2021

Related U.S. Application Data

(63) Continuation of application No. 16/398,343, filed on Apr. 30, 2019, now Pat. No. 10,841,999.

(51) Int. Cl.
*H05B 45/395* (2020.01)
*H05B 45/40* (2020.01)

(52) U.S. Cl.
CPC .......... *H05B 45/395* (2020.01); *H05B 45/40* (2020.01)

(58) Field of Classification Search
CPC .... H05B 45/395; H05B 45/40; H05B 45/325; H05B 45/355; H05B 45/36; H05B 45/34; Y02B 20/30
See application file for complete search history.

(56) References Cited

U.S. PATENT DOCUMENTS

| 2012/0200229 | A1* | 8/2012 | Kunst | H05B 45/3577 |
| | | | | 315/186 |
| 2015/0312983 | A1* | 10/2015 | Hu | F21V 3/00 |
| | | | | 315/186 |
| 2017/0231045 | A1* | 8/2017 | Hu | H05B 45/38 |

* cited by examiner

*Primary Examiner* — Daniel D Chang
(74) *Attorney, Agent, or Firm* — Tutunjian & Bietetto PC

(57) ABSTRACT

A driver circuit that includes an input side including a power input circuit and an output side including a light emitting diode (LED) output current circuit. The output side of the driver circuit includes an output smoothing capacitor for controlling flicker percentage. A light emitting diode (LED) power supply circuit is present between the input side and the output side for controlling current from the AC power input circuit to the light emitting diode (LED) output current circuit. The LED power supply circuit includes at least two linear current regulators that are connected in parallel. The circuit also includes a controller circuit including a controller for signaling the light emitting diode (LED) power supply to control current to the light emitting diode (LED) output current circuit to provide a lighting characteristic.

19 Claims, 5 Drawing Sheets

LOW STANDBY POWER SMART BULB BASED ON A LINEAR POWER SUPPLY

TECHNICAL FIELD

The present disclosure generally relates to methods and structures that incorporate linear power supplies into light emitting devices while simultaneously providing a suitable power factor and flicker percentage for the lamp. The present disclosure also relates to methods and structures that incorporate linear power supplies into light emitting devices providing acceptable thermal performance, and providing EMI filtering while receiving pulse width modulation (PWM) control signals.

BACKGROUND

Improvements in lighting technology often rely on finite light sources (e.g., light-emitting diode (LED) devices) to generate light. In many applications, LED devices offer superior performance to conventional light sources (e.g., incandescent and halogen lamps). Further, light bulbs have become smarter in recent years. People can now replace standard incandescent bulbs with smart bulbs that can be controlled wirelessly using smart phones or tablets. How to make a smart lamp not only with decent quality meeting all the standards, but also at a low price can be a challenge. This can be complicated by lighting standards that may be required of an area or jurisdiction. For example, smart lighting products sold in California are to meet CEC Title 21 tier 2 standards.

SUMMARY

In one embodiment, the methods and structures of the present disclosure provide a smart bulb with low standby power, low EMI emission, low cost, low flicker percentage, and a high-power factor in a linear power supply design.

In one aspect, a driver circuit for lighting applications is provided that includes a linear power supply circuit, in which the circuits when integrated into a smart bulb can provide a low standby power, low EMI emission, low cost, low flicker percentage, and a high-power factor.

In one embodiment, the driver circuit that includes an input side including a power input circuit and an output side including a light emitting diode (LED) output current circuit. The output side of the driver circuit includes an output smoothing capacitor for controlling flicker percentage. A light emitting diode (LED) power supply circuit is present between the input side and the output side of the driver circuit. The light emitting diode (LED) power supply circuit is for controlling current from the AC power input circuit to the light emitting diode (LED) output current circuit, wherein the LED power supply circuit includes at least one linear current regulator. The driver circuit includes a controller circuit including a controller for signaling the light emitting diode (LED) power supply to control current to the light emitting diode (LED) output current circuit to provide a lighting characteristic. In one embodiment, the at least one linear current regulator includes at least two linear current regulators that are in parallel connection, wherein by said parallel connection thermal load is divided between the at least two linear current regulators.

In some embodiments, the driver circuit can simultaneously provide both a flicker percentage that is less than 30%, and a power factor that is greater than 0.7. In some embodiments, the driver circuit does not include an input smoothing capacitor for controlling flickering in the input side of the driver circuit. In the driver circuit, the flickering percentage is controlled by the output capacitance only, via the output smoothing capacitor.

In some embodiments, the driver circuit further includes a communications module in communication with the controller circuit. The communications module can feed a pulse width modulation (PWM) signal to the input side of the driver circuit. This signal may be used to control the dimming settings of the light engine of the lamp being powered through the driver circuit. In some embodiments, the driver circuit further includes an electromagnetic interference (EMI) filter in the input side of the driver circuit. The electromagnetic interference (EMI) filter can be present between the bridge rectifier of the power input circuit and the light emitting diode (LED) power supply circuit.

In another aspect, a lamp is provided that can include a linear power supply circuit, in which the circuits when integrated into a smart bulb can provide a low standby power, low EMI emission, low cost, low flicker percentage, and a high-power factor. In some embodiments, the lamp includes light emitting diodes (LEDs) for providing light; and a driver package including an input side having a power input circuit and an output side having a light emitting diode (LED) output current circuit to the light engine, wherein the output side of the driver circuit includes an output smoothing capacitor for controlling flicker percentage. The driver circuit can also include a light emitting diode (LED) power supply circuit present between the input side and the output side of the driver circuit, wherein the LED power supply circuit includes at least one linear current regulator. The driver circuit can also include a controller circuit including a controller for signaling the light emitting diode (LED) power supply to control current to the light emitting diode (LED) output current circuit for powering the light engine. In one embodiment, the at least one linear current regulator includes at least two linear current regulators that are in parallel connection, wherein by the parallel connection thermal load is divided between the at least two linear current regulators.

In some embodiments, the light emitting diodes (LEDs) of lamp includes from 5 light emitting diodes (LEDs) to 25 light emitting diodes (LEDs) that are connected in series. In some embodiments, the lamp can simultaneously provide both a flicker percentage that is less than 30%, and a power factor that is greater than 0.7. The lamp may further include a communications module in communication with the controller circuit. The communications module can feed a pulse width modulation (PWM) signal to the input side of the driver circuit. The lamp may further include an electromagnetic interference (EMI) filter in the input side of the driver circuit. The EMI filter may filter the noise of the pulse width modulation (PWM) signal being fed to the driver circuit.

In another aspect, a method of powering a lighting device is provided, in which the method can provide a lamp having a low standby power, low EMI emission, low cost, low flicker percentage, and a high-power factor. In one embodiment, the method includes positioning a driver circuit between a power source and a light engine, the driver circuit including an input side including a power input circuit for communication to the power source, and an output side in communication with the light engine. The method further includes controlling flickering performance by positioning an output smoothing capacitor in the output side of the driver circuit, wherein the input side of the circuit does not include an input smoothing capacitor. The method further includes controlling current from the power source to the light engine with a light emitting diode (LED) power supply circuit that is present between the input side and the output side of the driver circuit. The light emitting diode (LED) power supply circuit includes at one linear current regulator. In some embodiments, the at least one linear current regulator includes at least two linear current regulators that are in parallel connection, wherein by the parallel connection thermal load is divided between the at least two linear current regulators. In some embodiments, the method can provide a lamp having a flicker percentage that is less than 30%, and having a power factor that is greater than 0.7. In some embodiments, controlling the current by the light emitting diode (LED) power supply circuit can include a pulse width modulation (PWM) control signal that is fed into the input side of the circuit. In some embodiments, the method may further include filtering noise from the pulse width modulation (PWM) control signal with an EMI filter positioned between the light emitting diode (LED) power supply circuit and the power source.

BRIEF DESCRIPTION OF THE DRAWINGS

The following description will provide details of embodiments with reference to the following figures wherein.

DETAILED DESCRIPTION

Figure 1:
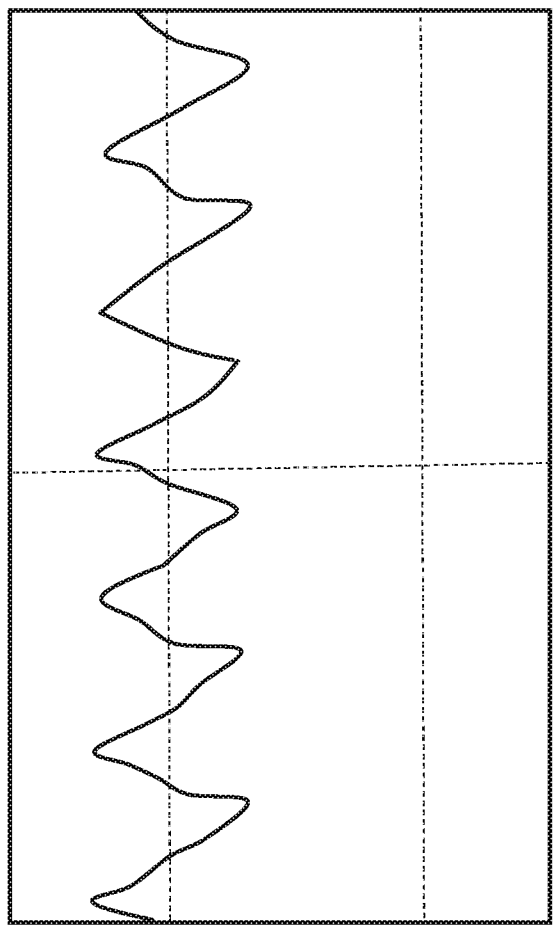
FIG. 1 is a plot illustrating an example of the peaks and troughs in a light output waveform (modulation) and the shape of the waveform, as used for describing a flickering percentage measurement.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the methods and structures described herein provide a linear power supply for powering smart bulbs, such as a smart bulb, that includes a light engine of light emitting diodes (LEDs). The smart lamps incorporating the linear power supply circuit design described herein, and depicted in one embodiment in FIG. 2, can have a low standby power, low EMI emission, low cost, low flicker percentage, and a high-power factor. As used herein, the term "smart bulb" or "smart LED bulb" denotes a lighting device, such as a light bulb or lamp, having a microcontroller as one of the components of the device, in which the microcontroller effectuates at least one set of instructions for controlling at least one characteristic of light being emitted from the device. A microcontroller may be an integrated circuit (IC) designed to govern a specific operation in an embedded system. In some embodiments, the microcontroller includes a processor, memory and input/output (I/O) peripherals on a single chip. The microcontroller may sometimes be referred to as an embedded controller or microcontroller unit (MCU). In smart lamps, a microcontroller can be used to control functions of the lamp, such as lighting characteristics, e.g., light color, light intensity, light temperature, light dimming, light flickering and combinations thereof. The microcontroller can also be used to turn the lamps ON and OFF in response to time, and calendar date. The microcontroller can also be used to change lighting characteristics in response to commands received wirelessly, e.g., from a user interface of a desktop computer and/or a wireless device, such as a tablet, smartphone or similar type device. The microcontroller can also change lighting characteristics in response to signal received from a sensor, such as a light sensor, motion sensor or other like sensor.

The methods and structures of the present disclosure provides a smart lamp having suitable lighting quality and low manufacturing cost, while meeting lighting standards, such as CEC Title 21 tier 2 standards. For example, to meet CEC Title 21 tier 2 standards, smart light bulbs less than 10 W, the bulb should satisfy the following conditions:
1. Flicker percentage: less than 30% for light component below 200 Hz, at either 100% or 20% light output level;
2. Standby power: less than 0.2 W;
3. Power factor: larger than 0.7;
4. EMI: satisfy FCC standard
5. Light efficiency: Lumen per Watt+2.3*CRI be larger than 297.

Additionally, from an electrical design perspective, the methods and structures of the present disclosure can provide a bulb having lower power requirements, good thermal performance, and pulse width modulation (PWM) control for RF control (wireless control), while providing a low-cost design. The methods and structures of the present disclosure also resolve the difficulties found in commercially available linear power supplies and switch mode power supplies.

A switched-mode power supply (switching-mode power supply, switch-mode power supply, switched power supply, SMPS, or switcher) is an electronic power supply that incorporates a switching regulator to convert electrical power. An SMPS transfers power from an AC source (often mains power) to DC loads, while converting voltage and current characteristics. Unlike a linear power supply, the pass transistor of a switching-mode supply continually switches between low-dissipation, full-on and full-off states, and spends little time in the high dissipation transitions, which minimizes wasted energy. Ideally, a switched-mode power supply dissipates no power. Voltage regulation is achieved by varying the ratio of on-to-off time. In contrast, a linear power supply regulates the output voltage by continually dissipating power in a pass transistor.

A linear voltage regulator, i.e., linear power supply, converts a varying DC voltage to a constant, often specific, lower DC voltage. In addition, they often provide a current limiting function to protect the power supply and load from overcurrent (excessive, potentially destructive current). A constant output voltage is desired in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator, i.e., linear power supply, to maintain the output voltage at a steady value, independent of fluctuations in input voltage and load impedance. Linear regulators can also reduce the magnitude of ripple and noise on the output voltage.

Switch mode power supplies employ magnetic components, capacitors and a switching device, such as a metal oxide semiconductor field effect transistor (MOSFET), bipolar junction transistor (BJT) or diode, to operate, and these components can be costly. In contrast, linear power supplies do not require switching devices or magnetic components, and it has been determined that linear power supplies can be implemented in low cost designs. It has also been determined that linear power supplies can be integrated with pulse width modulation (PMW) control, because linear power supplied can directly feed the pulse width modulation (PMW) signal to the control terminal of the power device. The switch supply controller must translate the pulse width modulation (PMW) input into other internal signals, and requires additional circuitry to do so, which adds cost to designs integrating switch supply controllers.

However, prior to the methods and structures of the present disclosure, linear power supplies have not been employed in lighting products, such as smart bulbs, which can meet the aforementioned CEC Title 21 Tier 2 requirements. It has been determined that the reason for linear power supplies not being employed in lighting procures, such as smart bulbs in products for meeting CEC Title 21 Tier 2 requirements, is that there are many other challenges emerge once using linear supplies in LED smart bulbs.

For example, it has been determined that linear power supplies in smart bulb applications, such as LED smart bulbs, have been unable to achieve a power factor higher than 0.7 simultaneously with providing a flicker percentage of less than 30%. "Power factor" is determined by the angle between the actual power and the apparent power, which can be derived from the angle between input current and input voltage. The higher the angle between input current and input voltage, the lower the power factor will be. Adding an input capacitor to the power supply circuit to increase capacitance will enlarge the angle between the input current and the input voltage, which will therefore reduce the power factor.

However, despite the disadvantages of adding a capacitor to a power supply circuit, e.g., the decrease in power factor in a linear power supply that results from adding a capacitor, the use of capacitors in power supply circuits can be needed to control the flicker performance of the power supply. AC lighting including incandescent, CFL and LED types generally exhibit varying degrees of flicker; usually at double the line frequency (100 Hz flicker for a 50 Hz mains frequency or 120 Hz for a 60 Hz mains frequency). While flicker above 75 Hz is not noticeable to most individuals, the perceptibility of flicker is not just a function of frequency, but also the relative intensity of the peaks and troughs of the light output waveform (modulation) and the shape of the waveform, which describes the duration of varying light levels over time within each cycle (duty cycle). FIG. 1 represents flicker for a 120 hz frequency signal. Referring to FIG. 1, the flicker percentage is a measure of the depth of modulation of flicker and is calculated using the following formula:

Percent Flicker=100%×(max−min)/(max+min)

The lower the flicker percent, the less substantial the flicker.

In one example, a driver, i.e., power supply, of a smart bulb including a linear power supply generally needs a large input capacitor, e.g., on the order of 0.1 µF to 1 mF, to provide a flicker percentage that is less than 30%. The AC waveform is sinusoidal. After the bridge, the negative half cycle is reversed. However, depth of modulation or flicker percentage is 100. If an electrolytic capacitor (eCap) is added to the circuit, near the peak of the waveform for the input voltage the e-cap is being charged, and while near the valley of the waveform, the e-cap releases energy to power up the light emitting diodes (LEDs). In this example, the e-cap serves as a valley filler for the output, making the output smoother. In some instances, the larger the e-cap is, the smoother the output voltage becomes.

One challenge to integrating a linear power supply into a smart bulb, e.g., light emitting diode (LED) smart bulb, is getting a power factor higher than 0.7 and flicker percentage lower than 30% at the same time while employing the linear power supply. The driver should have less input capacitance to get a higher power factor. Power factor is determined by the angle between actual power and apparent power, which can be derived from the angle between input current and input voltage. The higher angle between input current and input voltage, the lower power factor it will get. Adding a larger input capacitance will naturally enlarge the angle between input current and input voltage, thus reduce the power factor.

However, the driver will need a very large input capacitance to get a flicker percentage lower than 30%, and this is determined by the RC time constant. The LED load can be considered as a relatively constant resistance when it operates with stable voltage across it and stable current through it. In this way, in some embodiments, the RC time constant can determine how long it will take for the current through the LED to decay. The longer decay time with the driver, the less flicker percentage it will be able to offer. To get a flicker percentage lower than 30%, a large input capacitance, e.g., ranging from 0.1 µF to 1 mF, can be employed to make RC time constant rather long and thus longer decay time and less flicker percentage.

In view of the above determinations, the requirement on input capacitance for a higher power factor than 0.7 and flicker percentage less than 30% contradict with each other, and a single value of input capacitance may not meet both requirements.

Another problem with using linear supplies in LED smart bulbs is thermal design. The thermal pressure on output LED is rather low, but high on the power device and RF module. This can be due to the linear power supply topology, which puts a majority of power loss on the linear regulator.

A further difficulty with employing linear power supplies in LED smart bulbs is meeting EMI/EMC requirements with PWM implemented and no input capacitance. Electromagnetic interference (EMI) is a disturbance generated by an external source that affects an electrical circuit by electromagnetic induction, electrostatic coupling, or conduction. Electromagnetic compatibility (EMC) is the branch of electrical engineering concerned with the unintentional generation, propagation and reception of electromagnetic energy which may cause unwanted effects such as electromagnetic interference (EMI).

In a linear power supply, EMI/EMC is generally not a problem, because there is no switching noise in the driver.

However, in some examples, to implement PWM control, the PWM signal is fed on the AC input side. Also, the frequency of PWM signal should be high to avoid low frequency noise, which can cause visible flicker to the bulb. However, the high PWM frequency is also bad for EMI/EMC performance, because high PWM frequency signals are harder to filter out. Additionally, output capacitance generally can not filter out the noise produced by the PWM.

Prior to the methods and structures of the present disclosure, switch mode power supplies were used in smart light bulbs meeting CEC requirements. This approach resulted in a higher cost, making the smart light bulbs incorporating the switch mode power supplies that were suitable for the CEC requirements, such as CEC Title 21 Tier 2 requirements, less affordable for most households.

Figure 2:
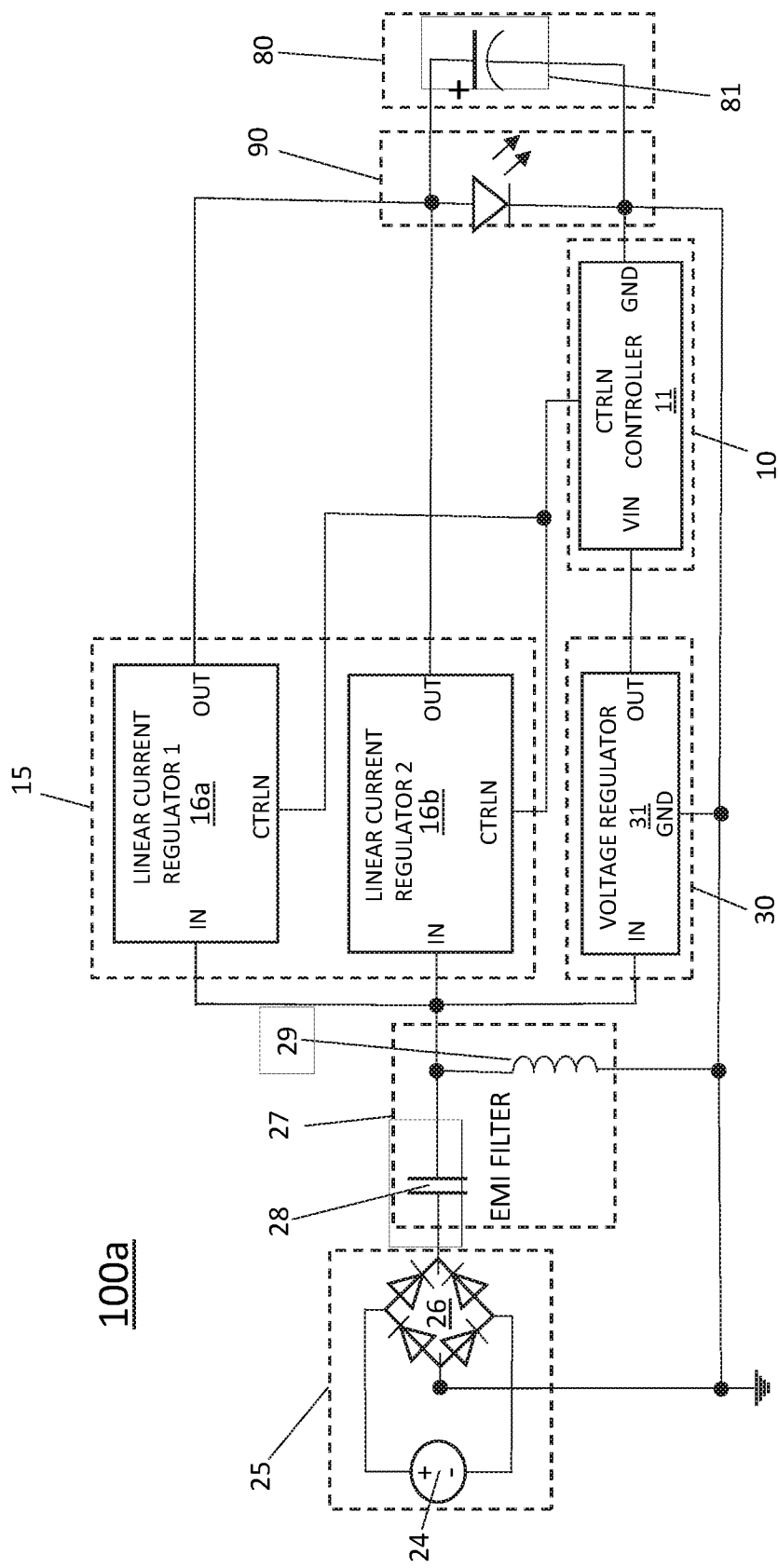
FIG. 2 is a circuit diagram of a linear power supply for integration into smart bulbs, such as light emitting diode (LED) smart bulbs, in which the linear power supply eliminates the input capacitance and use only the output capacitance to control flicker percentage in a design that meets CEC requirements, such as CEC Title 21 Tier 2 requirements, in accordance with one embodiment of the present disclosure.

In some embodiments, in view of the above discoveries and observations, methods and structures are described herein that can provide low-cost smart lamp products based on a linear power supply that meets all the CEC Title 21 Tier 2. As depicted in FIG. 2, in some embodiments, the linear power supply incorporated into the smartbulbs, i.e., light emitting diode (LED) smartbulbs, of the present disclosure can meet CEC requirements, such as CEC Title 21 Tier 2 requirements, in a design balancing flicker percentage, power factor, thermal performance and capability of PWM control input to work with RF wireless control.

The circuit of the linear power supply 100a depicted in FIG. 2 provides a low-cost solution with a linear power supply approach. This approach can apply rectified AC voltage across the LEDs 351, and provide a linear regulator integrated circuit (IC). The elimination of inductor and switching device significantly reduces cost of the driver.

Figure 3:
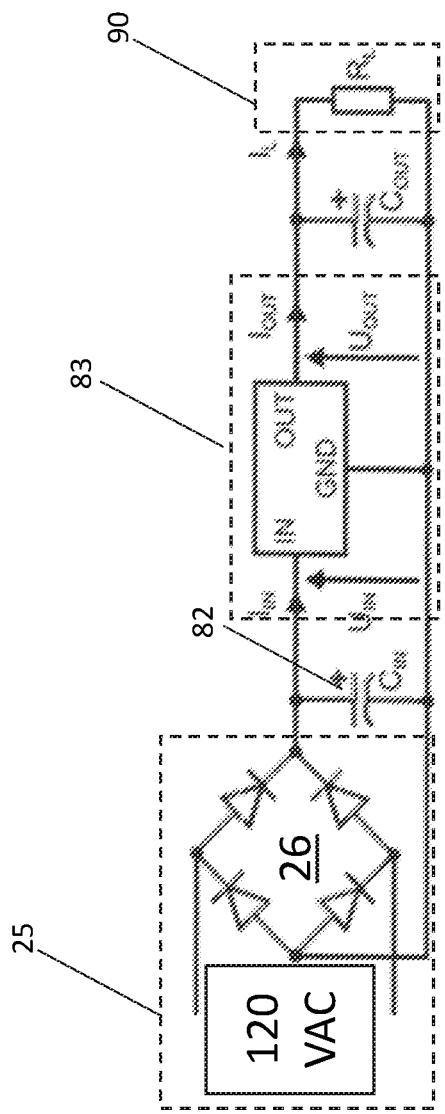
FIG. 3 is a circuit diagram of a comparative linear power supply.
Figure 4:
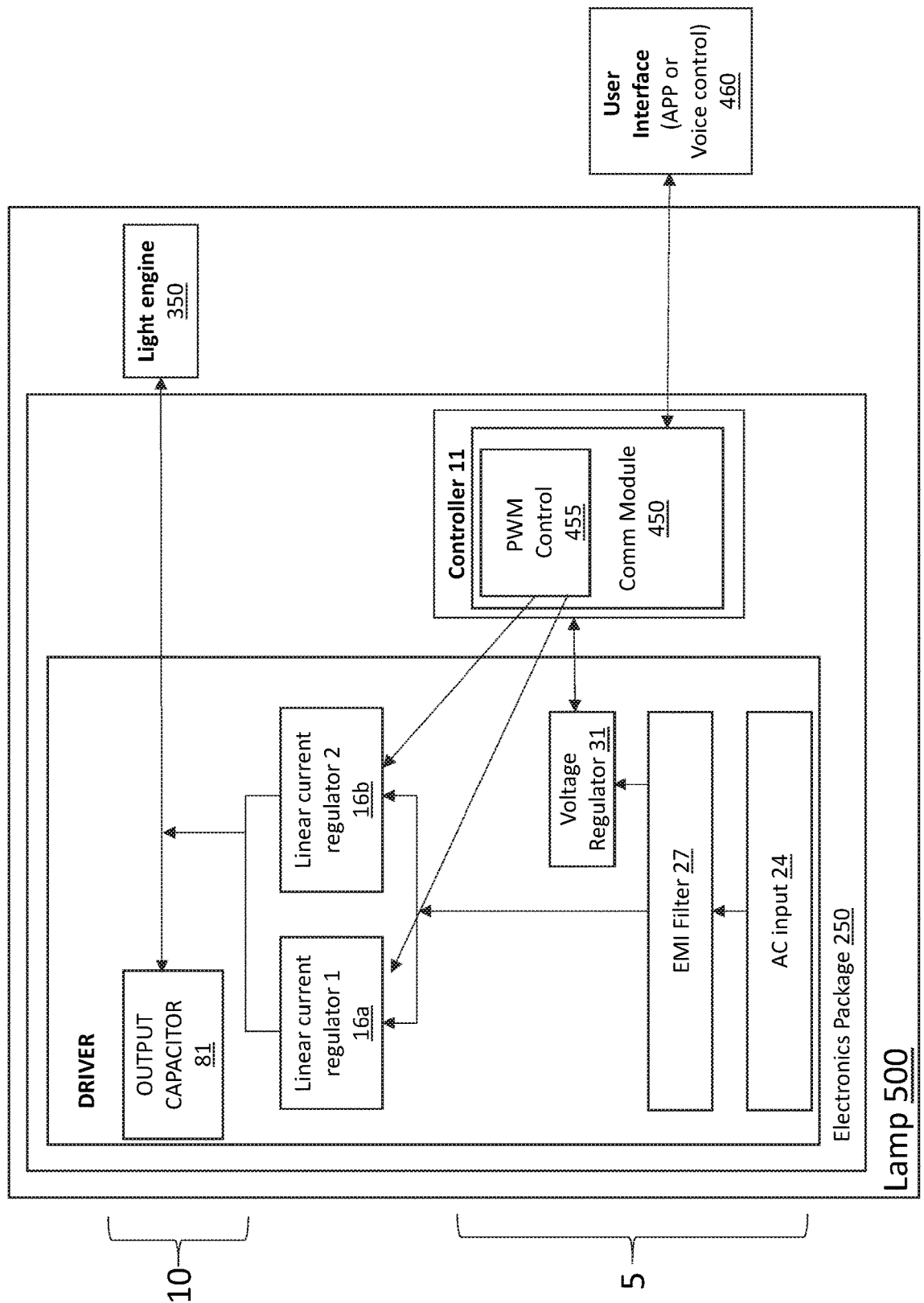
FIG. 4 is a block diagram illustrating a linear power supply circuit, as depicted in FIG. 2, integrated into a smart lamp, in accordance with one embodiment of the present disclosure.

To obtain a high power factor, in the circuit of the linear power supply 100a that is depicted in FIG. 2, a filtering capacitor (referred to as output smoothing capacitor 81) is located on the output stage, i.e., output capacitor circuit 80, directly between the output terminal to the light emitting diodes (LEDs)(referred to as the LED output circuit 90). A "capacitor" is a passive two-terminal electronic component that stores electrical energy in an electric field. In some embodiments, inside the capacitor, the terminals connect to two metal plates separated by a non-conducting substance, or dielectric. FIG. 3 depicts a comparative circuit for a linear power supply 100b, in which the filtering capacitor (also referred to as an input capacitor 82, is located right after the bridge rectifier 26 of the AC input 25 and before the power controller 83. The input capacitor 82 may also be referred to as smoothing capacitor. The input smoothing capacitor 82 may be employed to improve the average DC output of the rectifier, e.g., rectifying bridge 26, while at the same time reducing the AC variation of the rectified output by employing the input stabilizing capacitor 82 to filter the output waveform. In the comparative circuit of the linear power supply 100b, the input capacitor 82 provides a stable power source for the controller, but sacrifices the power factor. Referring to FIG. 2, in the linear power supply 100a employed in the driver electronics 250 (as depicted in FIG. 4) of the present disclosure, the filtering capacitor (referred to as output smoothing capacitor 81) is positioned between the output terminals of the LED output circuit 90 to the light emitting diodes (LEDs) 91 to provide a good power factor, e.g., a power factor greater than 0.7, and a low flicker percentage.

The circuit of the linear power supply 100a that is depicted in FIG. 2 is also capable of wireless control through RF module 450 and pulse width modulation (PWM). To provide that the bulb 500 is controllable through wireless communication, like Bluetooth, Wi-Fi and ZigBee, the controller circuit 10 of the bulb 500 can be in communication with an RF module 450 to receive commands from a user terminal device 460, which can be provided by a phone, a tablet or even voice control device like Alexa™ and Google™ home, and also a power controller circuit 30, e.g., voltage regulator 31, with capability of PWM input to control the output power, so that the user can dim the bulb 500 remotely.

Referring to FIG. 2, in some embodiments, to compensate the EMI noise brought by PWM of input current, an EMI filter circuit 27 is positioned within the linear power supply circuit 100a, in which the EMI filter circuit 27 is positioned before the power circuit, i.e., the LED power supply circuit 15. The linear power supply circuit 100a depicted in FIG. 2, which can include the EMI filter circuit 27, can meet FCC requirements. In some embodiments, the EMI filter circuit 27 has two types of components that work together to suppress these signals. For example, the EMI filter circuit 27 may include capacitors 28 and inductors 29. The capacitor 28 can inhibit direct current, in which a significant amount of electromagnetic interference is carried into a device, while permitting alternating current to pass. The inductor is essentially a tiny electromagnet that is able to hold energy in a magnetic field, as electric current is passed through it, thereby reducing total voltage. The capacitors 28 used in EMI filter circuit 27 can be called EMI capacitors, which redirect current in a specific range, high frequency, away from a circuit or component. The EMI capacitor 28 feeds the high frequency current/interference into at least one inductor 29, in which when multiple inductors 29 are used they can be arranged in series. As the current passes through the inductor 29, the overall strength or voltage is reduced.

Referring to FIG. 2, in some embodiments, the linear power supply circuit 100a powers a dedicatedly designed LED load (eighteen 8.2 V LEDs in series), the driver can operate with a fairly high efficiency under standard 120V AC input. For example, the stabilized efficiency is above 88%. A stabilized efficiency being higher than 88% is even higher than most of the switch-mode power supplies. The LEDs may be surface mount devices (SMD) of type 2835 LEDs. The forward voltage for the LEDs may be greater than 8.2V, e.g., be greater than 8.7V.

In some embodiments, the LED power supply circuit 15 includes at least one linear current regulator. Referring to FIG. 2, in some embodiments of the linear power supply circuit 100a, the LED power supply circuit 15 employs two linear power supply modules (IC), i.e., linear current regulators 16a, 16b, in parallel to share the thermal pressure. The term "parallel" when describing electrical components in a circuit, denotes that the two or more components are connected in parallel, so that they have the same difference of potential (voltage) across their ends. The potential differences across the components are the same in magnitude, and they also have identical polarities. The same voltage is applied to all circuit components connected in parallel. The total current is the sum of the currents through the individual components that are connected in parallel, in accordance with Kirchhoff's current law.

A linear regulator is a system used to maintain a steady current or voltage. For example, the resistance of the regulator varies in accordance with the load resulting in a constant output voltage. The regulating device is made to act like a variable resistor, continuously adjusting a voltage divider network to maintain a constant output voltage and continually dissipating the difference between the input and regulated voltages as waste heat. Linear regulators may place the regulating device in parallel with the load (shunt regulator) or may place the regulating device between the source and the regulated load (a series regulator). Simple linear regulators may only contain a Zener diode and a series resistor; more complicated regulators include separate stages of voltage reference, error amplifier and power pass element.

By employing an LED power supply circuit 15 that includes two linear power supply modules (IC), i.e., linear current regulators 16a, 16b, in parallel, the methods described herein provide that the heat generated by the linear power supply circuit 100a is more evenly distributed, and that the peak temperature on the driver is reduced. In such way the driver is more reliable and thermally stable.

The structures and methods of the present disclosure, including the linear power supply circuit 100a depicted in FIG. 2, can provide a smart bulb that is low-cost (using linear power supply topology), meets the CEC Title 21 Tier 2 requirements, and can be controlled wirelessly by other devices through PWM internally. The components depicted in FIGS. 2 and 4 are now described in greater detail.

To solve the challenge of the fact that there is no input capacitance value that could achieve the power factor higher than 0.7 and flicker percentage less than 30% at the same time, the linear power supply circuit 100a that is depicted in FIG. 2 eliminates the input capacitance and uses only the output capacitance via the output smoothing capacitor 81. An example of a circuit that includes an input capacitor 82 is in FIG. 3, which depicts a comparative circuit 100b having an input capacitor 82 that is positioned between the bridge rectifier 26 of the AC input circuit 25 and a linear power supply 83. The input capacitor 82 of the comparative circuit 100b is not present in the linear power supply circuit 100a that is depicted in FIG. 2. Referring to FIG. 2, because the input capacitor 82 is not present in the linear power supply circuit 100a, the LED power supply circuit 15 of the linear power supply circuit 100a that employs two linear power supply modules (IC), i.e., linear current regulators 16a, 16b, is not regulating the output current anymore, but the input current. As the result, less capacitance is seen from the AC line, e.g., AC input 24, and power factor higher than 0.7 can be achieved. Meanwhile, a proper capacitance on the output side of the linear power supply circuit 100a can reduce the flicker percentage to less than 30%.

As depicted in FIGS. 2 and 4, the output side 10 of the linear power supply circuit 100a is positioned between the light emitting diode (LED) power supply circuit 15 and the LED output circuit 90, and includes the output capacitor 81. The input side 5 of the linear power supply circuit 100a is positioned between the AC power source circuit 25 and the light emitting diode (LED) power supply circuit 15, and can include EMI filter circuit 27, the controller power supply circuit 30, and the control circuit 10. There is no input capacitor (also referred to as smoothing input capacitor) on the input side 5 of the linear power supply circuit 100a.

In some embodiments, the power factor that can be achieved in smart bulbs 500 employing the linear power supply circuit 100a that is depicted in FIG. 2 may range from 0.7 to 0.999. In some examples, the power factor that can be provided by the linear power supply circuit 100a that is depicted in FIG. 2 may be equal to 0.7, 0.725, 0.75, 0.775, 0.8, 0.825, 0.85, 0.875, 0.9, 0.925, 0.95, 0.975, 0.98, 0.985 as well as any range of power factors included a lower limit selected from the aforementioned examples, and an upper limit selected from one of the aforementioned examples. The power factor may also be a number between the upper and lower limits of the aforementioned ranges.

In some embodiments, the flicker percentage that can be achieved in smart bulbs 500 employing the linear power supply circuit 100a that is depicted in FIG. 2 may range from 1% to 30%. In some examples, the flicker percentage that can be provided by the linear power supply circuit 100a that is depicted in FIG. 2 may be equal to 1%, 5%, 10%, 15%, 20%, 25% and 30%, as well as any range of flicker percentages included a lower limit selected from the aforementioned examples, and an upper limit selected from one of the aforementioned examples. The flicker percentage may also be a number between the upper and lower limits of the aforementioned ranges.

The output smoothing capacitor 81 may be an electrolytic capacitor (e-cap). An e-cap is a polarized capacitor whose anode or positive plate is made of a metal that forms an insulating oxide layer through anodization. This oxide layer acts as the dielectric of the capacitor. A solid, liquid, or gel electrolyte covers the surface of this oxide layer, serving as the (cathode) or negative plate of the capacitor. Due to their very thin dielectric oxide layer and enlarged anode surface, electrolytic capacitors have a higher capacitance-voltage (CV) product per unit volume than ceramic capacitors or film capacitors, and so can have large capacitance values. The electrolytic capacitor for the output capacitor 81 may be provided by at least one of an aluminum electrolytic capacitor, a tantalum electrolytic capacitor, a niobium electrolytic capacitor, and combinations thereof. In one example, the output capacitor 81 has a value ranging from 0.1 µF to 1 mF. In another example, the output capacitor 81 has a value ranging from 0.5 µF to 0.5 mF.

It is noted that the output smoothing capacitor 81 is not limited to only the aforementioned examples. For example, in addition to the output smoothing capacitor 81 being provided by an electrolytic capacitor (e-cap), in some examples, the output smoothing capacitor 81 may also be provided by a ceramic capacitor and/or film capacitor. Additionally, the output capacitor 81 that is depicted in FIG. 2 is not limited to being only a single capacitor. Multiple capacitors can be used for the output smoothing capacitor 81 to achieve the same result. For example, the number of capacitors that can be substituted for the single output capacitor 81 depicted in FIG. 2 may be equal to 2, 4, 6, or 8 capacitors, in any combination of series or parallel connections.

Figure 5:
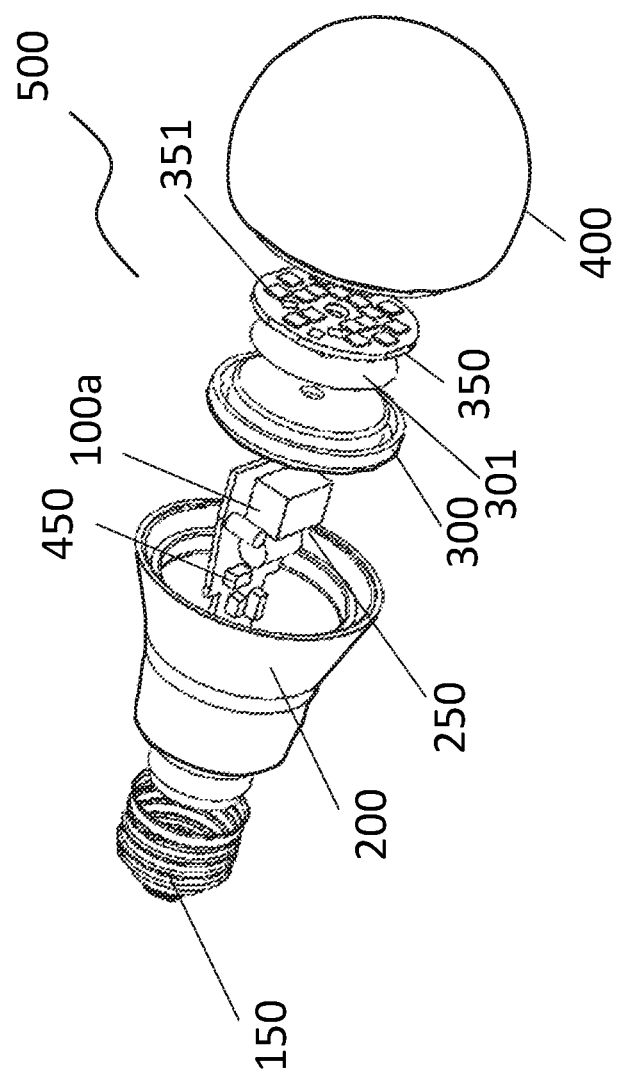
FIG. 5 is an exploded view of a lamp including a linear power supply as depicted in the circuit illustrated in FIG. 2 and the block diagram illustrated in FIG. 4, in accordance with one embodiment of the present disclosure.

The linear power supply circuit 100a depicted in FIGS. 2 and 4 provides power from an AC input source 24, and powers a light engine 350 (as depicted in FIG. 5). The AC input source 24 is converted to DC current by a bridge rectifier, e.g., diode bridge rectifier 26, and a voltage regulator 31 of a controller power supply circuit 30 provides a constant voltage to a controller circuit 10, which may include a microcontroller 11. The controller circuit 10, e.g., microcontroller 11, is in electrical communication with the LED power supply circuit 15. The LED power supply circuit 15 dictates current flowing to the LED outlet 90, which powers the light emitting diodes (LEDs) of the light engine 350. Signal from the microcontroller 11 can control the LED power supply circuit 15 to control the current being sent to the LED out 90, in accordance with the lighting characteristics being controlled through the microcontroller 11.

A linear regulator, such as each of the two linear current regulators 16a, 16b in the LED power supply circuit 15, is a system used to maintain a steady current or voltage. For example, the resistance of the regulator varies in accordance with the load resulting in a constant output voltage. The regulating device is made to act like a variable resistor, continuously adjusting a voltage divider network to maintain a constant output voltage and continually dissipating the difference between the input and regulated voltages as waste heat. Simple linear regulators may only contain a Zener diode and a series resistor; more complicated regulators include separate stages of voltage reference, error amplifier and power pass element.

In one example, the linear current regulators 16a, 16b may be a dual channel Pulse Width Modulation (PWM)/ analog dimmable linear constant current light emitting diode (LED) driver. The dual channel Pulse Width Modulation (PWM)/analog dimmable linear constant current light emitting diode (LED) driver may include a 120 mA/500V metal oxide semiconductor (MOS) device. The dual channel Pulse Width Modulation (PWM)/analog dimmable linear constant current light emitting diode (LED) driver may support up to 10 kHz PWM frequency. The dual channel Pulse Width Modulation (PWM)/analog dimmable linear constant current light emitting diode (LED) driver may be available in an ESOP-8 package.

In some embodiments, to ease the thermal pressure on power supply 100a, the at least two linear current regulators 16a, 16b are connected in parallel to share the thermal pressure. In this way, the heat is more evenly distributed and the peak temperature on the driver is reduced. In such way the driver is more reliable and thermally stable. Additionally, the power loss on power device (linear regulator) is determined by the voltage difference between input voltage (from rectified AC input) and output voltage (forward voltage of LED load). To lower the thermal loss on the power device, a high forward voltage LED load is implemented in the design depicted in FIG. 2. In one embodiment, the high forward voltage may range from 135V to 155V. In another embodiment, example, the high forward voltage may range from about 140V to 150V. In one example, the forward voltage LED load may be equal to 148V.

Taking into account the example, in which the forward voltage LED load is 148V, and the household electricity in North American being delivered at 120 VAC (volts alternating current) 60 Hz, the peak voltage 120 Volts×√2~169 Volts. The LEDs 351 and the light emitting diode (LED) power supply circuit 15 (also referred too linear regulator IC), which include the linear current regulators 16a, 16b, are connected in series. In the example, in which the LED load is 148V, the majority of the LED load is applied to the LED load and the remainder is applied to the light emitting diode (LED) power supply circuit 15 (also referred to as linear regulator IC), which include the linear current regulators 16a, 16b. For example, when the peak voltage is 169V and the LED load is 148V, the remainder is 21V, which is applied to the light emitting diode (LED) power supply circuit 15. In this example, a higher LED voltage will lead to a lower voltage on the light emitting diode (LED) power supply circuit 15 (also referred too linear regulator IC), and a lower voltage on the light emitting diode (LED) power supply circuit 15 (also referred too linear regulator IC) will lead to less heat being generated in the light emitting diode (LED) power supply circuit 15 (also referred too linear regulator IC).

The number of linear power supply module (IC), i.e., linear current regulators 16a, 16b, is not limited to only two. Multiple power supply modules or one power supply module with a bigger size can also be used in ways consistent with the present disclosure.

Still referring to FIG. 2, in some embodiments, to solve the electromagnetic interference (EMI) problem brought by a pulse width modulation (PWM) signal on the input side of the linear power supply circuit 100a, i.e., the side of the linear power supply circuit 100a between the AC input circuit 25 and the input to the light emitting diode (LED) power supply circuit 15, an EMI filter circuit 27 is implemented right after rectified AC input circuit 25. In some embodiments, the EMI filter circuit 27 is implemented as a low-power-consuming EMI filter to keep the standby power (the power consumed by the driver when no light output) lower than 0.2 W to meet CEC requirement. For example, the standby power may range from 0.025 W to 0.2 W. In another example, the standby power for the linear power supply circuit 100a may range from 0.075 W to 0.175 W. It is noted that the above ranges for the standby power is provided for illustrative purposes only, and are not intended to limit the present disclosure. In other examples, the standby power may be equal to 0.05 W, 0.075 W, 0.10 W, 0.125 W, 0.15 W, 0.175 W and 0.2 W, as well as any range of standby power values using one of the aforementioned values as a lower limit to the range, and using one of the aforementioned values as an upper limit to the range. The standby power may also be any value that is within the above ranges.

The EMI filter circuit 27 may include an inductor 28. An inductor 28, also called a coil, choke, or reactor, is a passive two-terminal electrical component that stores energy in a magnetic field when electric current flows through it. The inductor 28 may be a ceramic core inductor or an air core inductor. In one example, the inductor 28 may have an inductance ranging from 100 nanohenry (nH) to 20 milli henry (mH). In another example, the inductor 28 of the EMI filter circuit 27 can have an inductors ranging from 200 nH to 15 mH. In yet another example, the inductor 28 may range from 1 mH to 10 mH.

The capacitor 29 of the EMI filter circuit 27 may be an electrolytic capacitor (e-capacitor). The electrolytic capacitor for the EMI filter circuit 27 may be provided by at least one of an aluminum electrolytic capacitor, a tantalum electrolytic capacitor, a niobium electrolytic capacitor, and combinations thereof. In one example, the EMI filter circuit 27 has a capacitor 29 having a capacitance value ranging from 10 nF to 20 µF. In another example, the EMI filter circuit 27 has a capacitor 29 having a capacitance value ranging from 1 µF to 15 µF. It is noted that the EMI filter circuit 27 is not limited to embodiments, in which the EMI filter circuit 27 only includes one capacitor 29. The EMI filter circuit 27 may include multiple capacitors, e.g., two capacitors 29 can be present in the EMI filter circuit 27.

It is noted that the EMI filter circuit 27 is not limited to only pi (π) structure, e.g., including two capacitors 29 and one inductor 28. It can be changed to any combination of m capacitors 29 and n inductors 28 (both m and n are integers, and m and n cannot be zero at the same time), such as one capacitor and one inductor, one capacitor and no inductors, two capacitors and two inductors, etc.

Referring to FIG. 2, the AC input source 24 for the linear power supply circuit 100a is a component of an AC power input circuit 25 that includes a bridge rectifier. In some embodiments, the bridge rectifier is a diode bridge rectifier 26 connected to the AC power input 24. Diodes D1, D2, D3, D4 can be connected together to form a full wave rectifier that convert AC voltage into DC voltage for use in power supplies. The diode bridge rectifier 26 may include four diodes D1, D2, D3, D4 that are arranged in series pairs with only two diodes conducting current during each half cycle. During the positive half cycle of the supply, diodes D1 and D2 conduct in series while diodes D3 and D4 are reverse biased and the current flows through the load. During the negative half cycle of the supply, diodes D3 and D4 conduct in series, but diodes D1 and D2 switch "OFF" as they are now reverse biased. It is noted that the power source does not necessarily have to be an AC power source. For example, the power source for the linear power supply circuit 100*a* may be a DC power source with minor adjustments such as removing the rectifying components. The EMI filter circuit 27 is positioned between the AC input source 24 and the LED power supply circuit 15 that includes at least one linear regulator, such as the two linear current regulators 16*a*, 16*b* that are connected in parallel, as depicted in FIG. 2.

In some embodiments, the control circuit 10, which may include a microcontroller 11, that is depicted in FIG. 2 sends signals to the light emitting diode (LED) power supply circuit 15. The control circuit 10 is in electrical communication to the AC power input circuit 25 through a controller power supply circuit 30, which includes a voltage regulator 31 to provide constant voltage of the control circuit 10. In accordance with the signals sent from the microcontroller 11, e.g., commands, the power to the LED output circuit 90 is adjusted by the light emitting diode (LED) power supply circuit 15, which can change the characteristics of the light being emitted by the light source.

A "microcontroller" is an integrated circuit (IC) designed to govern a specific operation. In some embodiments, the microcontroller 11 includes a processor, memory and input/output (I/O) peripherals on a single chip. In some embodiments, adjustments to the light emitted by the lamp can be implemented with a microcontroller 11 having input/output capability (e.g., inputs for receiving user inputs; outputs for directing other components) and a number of embedded routines for carrying out the device functionality. The microcontroller 11 can be substituted with any type of controller that can control the LED power supply.

For example, the control circuit 10 may include memory and one or more processors, which may be integrated into the microcontroller 11. The memory can be of any suitable type (e.g., RAM and/or ROM, or other suitable memory) and size, and in some cases may be implemented with volatile memory, non-volatile memory, or a combination thereof. A given processor of the control circuit 10 may be configured, for example, to perform operations associated with the light engine 350 (as depicted in FIG. 5) through the LED output circuit 90. In some cases, memory may be configured to store media, programs, applications, and/or content on the control circuit 10*a* on a temporary or permanent basis. The one or more modules stored in memory can be accessed and executed, for example, by the one or more processors of the control circuit 10. In accordance with some embodiments, a given module of memory can be implemented in any suitable standard and/or custom/proprietary programming language, such as, for example C, C++, objective C, JavaScript, and/or any other suitable custom or proprietary instruction sets, as will be apparent in light of this disclosure. The modules of memory can be encoded, for example, on a machine-readable medium that, when executed by one or more processors, carries out the functionality of control circuit 10, e.g., microcontroller 11, in part or in whole. The computer-readable medium may be implemented, for instance, with gate-level logic or an application-specific integrated circuit (ASIC) or chip set or other such purpose-built logic. Some embodiments can be implemented with a microcontroller 11 having input/output capability (e.g., inputs for receiving user inputs; outputs for directing other components) and a number of embedded routines for carrying out the device functionality. The memory may include an operating system (OS). As will be appreciated in light of this disclosure, the OS may be configured, for example, to aid with the lighting controls to provide reset functions, as well as to control the characteristics of light being emitted by the light engine 350 (as depicted in FIG. 5) through the LED output circuit 90.

Referring to FIGS. 2 and 4, the microcontroller 11 can provide signals for adjustments in lighting characteristics emitted by the light engine 350 (as depicted in FIG. 5) in accordance with the lighting characteristics programmed by the user of the light source. The user may program the lamp 500, e.g., program the microcontroller 11 of the lamp 500, by a user interface 460, such as an interface 460 provided by a computer, desktop computer, laptop computer, tablet computer, smart phone, mobile device etc. The user interface 460 can be in communication wirelessly to the microcontroller 11.

Referring to FIGS. 2 and 4, communication from the user interface 460 to the control circuit 10, which can include a microcontroller 11, can be across a communications module 450, e.g., RF module. An RF module (radio frequency module) is a (usually) small electronic device used to transmit and/or receive radio signals between two devices. The protocol of RF module is not limited to Bluetooth and/or any other Bluetooth protocol, such as BLE mesh. It can be Wi-Fi, ZigBee, ZWave, Thread, WeMo and any other form of wireless communication.

The communications module 450 can also implement pulse width modulation (PWM) control of the driver electronics 250, as depicted in FIGS. 2, 4 and 5. Pulse width modulation (PWM) is a technique for controlling analog circuits with a microprocessor's digital outputs. The linear power supply 100*a* depicted in FIG. 2 can implement pulse width modulation (PWM) control, since it can directly feed the PWM signal to the control terminal of the lamp 500, in which the control terminal is a component of the control circuit 10, which can include the microcontroller 11. The communications module 450 typically includes a PWM power controller 455 with the capability of PWM input to control the output power to the LED output circuit 90. In some embodiments, the PWM input can provide that a user can dim the light emitting diodes (LEDs) of the light engine 350 remotely. For PWM dimming, the driver electronics 250 supplies pulses of full-amplitude current to the light emitting diodes (LEDs) of the light engine. The driver varies the duty cycle of the pulses to control the apparent brightness. PWM dimming relies on the capability of the human eye to integrate the average amount of light in the pulses. Provided the pulse rate is high enough, the eye does not perceive the pulsing but only the overall average. In some embodiments, PWM dimming may employ a PWM controller and a MOSFET switch in the driver electronics 250 at the output of the DC power supply. These components may be provided by the controller circuit 10, e.g., the microcontroller 11 of the controller circuit 10.

In accordance with the structures and methods of the present disclosure, to implement PWM control, the PWM signal is fed into the linear power supply circuit 100*a* on the AC input side 5 of the linear power supply circuit 100*a*. In some embodiments, the AC input side 5 is between the power input circuit 25 and the light emitting diode (LED) power supply circuit 15. The output side 10 of the linear power supply circuit 100*a* is positioned between the light emitting diode (LED) power supply circuit 15 and the LED output circuit 90. The output side 10 of the linear power supply circuit 100*a* includes the output smoothing capacitor 81.

In some embodiments, the frequency of PWM signal is selected to be high to avoid low frequency noise, which can cause visible flicker to the bulb. For example, the frequency of the PWM control signal may range from 100 Hz to 1 GHz. In some embodiments, the PWM control signal may range from 500 Hz to 500 kHz. In one example, the frequency of the PWM control signal is equal to 7.5 kHz. Any frequency in the range of is possible for the PWM signal. The PWM output of the RF module, e.g., communications module 450, can be translated to an analog voltage, e.g., between 0-10V, or a digital package can be employed to control the power supply.

The high PWM frequency can be bad for EMI/EMC performance, especially conducted EMI ranges that range from 150 kHz to 30 MHz per FCC 47 CFR Part 15 Class B. However, to solve the electromagnetic interference (EMI) problem brought by a pulse width modulation (PWM) signal on the input side 5 of the linear power supply circuit 100a, i.e., the side of the linear power supply circuit 100a between the AC input circuit 25 and the input to the light emitting diode (LED) power supply circuit 15, an EMI filter circuit 27 is implemented right after rectified AC input circuit 25.

Referring to FIG. 2, the control circuit 10, e.g., microcontroller 11, may be powered through a voltage regulator 31 that provides a constant voltage level to the control circuit 10. The input of the controller power supply circuit 30 is from the rectifying bridge 26 of the AC input 25. The output of the controller power supply circuit 30 is to the controller circuit 10, in which that power that is communicated from the power supply circuit 30 to the controller circuit 10 is for the purposes of powering the controller circuit 10. The controller circuit 10, which can include a microcontroller 11, has a control output to the LED power supply circuit 15. The power supply circuit 15 may have an output in electrical communication with the output LED circuit 90. In this example, the microcontroller 11 can provide signals for controlling the power supply circuit 15. The microcontroller 11 can provide signals for controlling the power supply circuit 15 to adjust the power being supplied to the output LED circuit 15, in which the adjustment to the power to the output LED circuit 15 is in accordance with the lighting characteristics being controlled by the microcontroller 11.

The controller power supply circuit 30 depicted in FIG. 2 may include a voltage regulator 31. A voltage regulator is a system designed to maintain a constant voltage level. A voltage regulator may use a simple feed-forward design or may include negative feedback. It may use an electromechanical mechanism, or electronic components. In some embodiments, the voltage regulator 31 may be a non-isolated buck switch for constant output voltage applications, in which the output voltage can be adjusted. The programmable output voltage of the non-isolated buck switch may support 3.0V to 3.5V without LDO. The LDO is the low-drop-out regulator. The non-isolated buck switch may integrate a 700V power metal oxide semiconductor field effect transistor (MOSFET). The non-isolated buck switch may be available in an SOP-8 package. It is noted that the example provided above for the voltage regulator 31 is provided for illustrative purposes only. In some embodiments, the power supply, e.g., voltage regulator 31 for the controller power supply circuit 30, can be a linear power supply or switch mode power supply.

The linear power supply circuit 100a may be integrated into the driver electronics 250 (also referred to as driver package) of a lamp 500 employing a light engine 350 including a solid state light source, such as light emitting diodes (LEDs), as depicted FIG. 5. For example, the driver electronics 250, e.g., lighting circuit, is a circuit for causing the light emitting diodes (LEDs) of the light engine 350 to emit light and is housed in the base housing 200. More specifically, the driver electronics 250, e.g., lighting circuit, includes a plurality of circuit elements, and a circuit board on which each of the circuit elements is mounted. In this embodiment, the driver electronics 250, e.g., lighting circuit, converts the AC power received from the base 150 of the base housing 200 to the DC power, and supplies the DC power to the LEDs of the light engine 350. The linear power supply circuit 100a may be at least one component of the driver electronics 250.

Referring to FIG. 5, the driver electronics 250 may include a communications module 450 for providing wireless communication from a user interface for receipt of programmed light characteristic settings received from the user. The communication module 251 may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In some embodiments, the communication module 450 may be configured for communication by cellular signal used in cellular phones, and cellular type devices. In some embodiments, communication module 450 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol or Bluetooth Low Energy (BLE) or BLE mesh; (4) a digital addressable lighting interface (DALI) protocol; (5) a ZigBee protocol or Thread; (6) a near field communication (NFC) protocol; (7) a local area network (LAN)-based communication protocol; (8) a cellular-based communication protocol; (9) an Internet-based communication protocol; (10) a satellite-based communication protocol (11) Powerline Communications (PLC); (12) 0-10V dimmer; (13) Digital Addressable Lighting Interface (DALI) and/or (14) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 251, as desired for a given target application or end-use.

The driver electronics 250 including the linear power supply circuit 100a may be housed within a base housing 200 that is composed of a resin material. The base housing 200 can be provided at the opening of the globe 400. More specifically, the base housing 200 is attached to the globe 400 using an adhesive such as cement to cover the opening of the globe 400. The base 150 is connected to the end of the base housing 200 that is opposite the end of the base housing 200 that is closest to the globe 400. In the embodiment that is depicted in FIG. 5, the base 150 is an E26 base. The light bulb shaped lamp 500 can be attached to a socket for E26 base connected to the commercial AC power source for use. Note that, the base 150 does not have to be an E26 base, and maybe a base of other size, such as E17. In addition, the base 150 does not have to be a screw base and may be a base in a different shape such as a plug-in base.

Referring to FIG. 5, the lamp 500 employs light engine 350 including solid state light emitters, e.g., light emitting diodes (LEDs) 351, to provide the light illumination. The term "solid state" refers to light emitted by solid-state electroluminescence, as opposed to incandescent bulbs (which use thermal radiation) or fluorescent tubes. Compared to incandescent lighting, solid state lighting creates visible light with reduced heat generation and less energy dissipation. Some examples of solid state light emitters that are suitable for the methods and structures described herein include semiconductor light-emitting diodes (LEDs), organic light-emitting diodes (OLED), polymer light-emitting diodes (PLED) or combinations thereof. Although the following description describes an embodiment in which the solid state light emitters are provided by light emitting diodes, any of the aforementioned solid state light emitters may be substituted for the LEDs.

In the embodiment depicted in FIG. 5, the light source for the light engine is provided by light emitting diodes (LEDs) 351. In a broad sense, a light emitting diode (LED) 351 is a semiconductor device that emits visible light when an electric current passes through it. Some examples of solid state light emitters that are suitable for the methods and structures described herein include inorganic semiconductor light-emitting diodes (LEDs), organic semiconductor light-emitting diodes (OLEDs), surface mount light emitting diodes (SMT LEDs), polymer light-emitting diodes (PLED), filament type light-emitting diodes (LEDs) or combinations thereof.

The LEDs 351 can be mounted to a panel, also referred to as a substrate, in which the LEDs may include several surface mount device (SMD) light emitting diodes (LEDs). In one example, a LED bulb, as depicted in FIG. 5, can contain a single LED 351 to arrays of 5 to 10 LEDs 351.

The light engine 350 may include light emitting diodes (LEDs) 351 engaged to a circuit board including substrate. The LEDs 351 can be mounted to the circuit board by solder, a snap-fit connection, or other engagement mechanisms. In some examples, the LEDs 351 are provided by a plurality of surface mount discharge (SMD) light emitting diodes (LED). The circuit board may be a printed circuit board (PCB) the mechanically supports and electrically connects electronic components, such as the LEDs 351, using conductive tracks, pads and other features etched from copper sheets laminated onto a non-conductive substrate. The printed circuit board is typically composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinylester, or polyester thermosetting plastic, though phenol formaldehyde resins are still in use. In some embodiments, the printed circuit board (PCB) is composed of a composite consistent with the above description that is called FR-4. The printed circuit board may be made in one piece or in longitudinal sections joined by electrical bridge connectors. In some cases, circuit board may further include other componentry, such as, for example, resistors, transistors, capacitors, integrated circuits (ICs), and power and control connections for a given LED, i.e., solid state light emitter, to name a few examples.

In some embodiments, the light engine 350 may include LEDs that are part of an LED filament structure. The LED filament structure may include a substrate and a plurality of series connected light emitting diodes (LEDs) that are present on the substrate that extending from a cathode contact portion of the LED filaments structure to an anode contact portion of the LED filament structure. The series connected light emitting diodes (LEDs) of the LED filament structure can be covered with a phosphorus coating. In some embodiments, each of the light emitting diode (LED) filament structures includes LED's arranged in rows on small strips. In one example, the number of LEDs arranged on the substrate of the light emitting diode (LED) filaments structure can range from 10 LEDs to 50 LEDs. In some embodiments, the LED filament structure is composed of a metal strip with series of LEDs aligned along it. A transparent substrate, usually made from glass, e.g., silicon (Si) and/or silicon oxide ($SiO_2$), or sapphire, e.g., aluminum oxide ($Al_2O_3$), materials are used to cover the LED's. This transparency allows the emitted light to disperse evenly and uniformly without any interference or light loss. The LEDs may be referred to as chip on board (COB) and/or chip on glass (COG). In one example, the LED's on the filament strip emit a blue colored light. For example, the blue light emitted by the LEDs on the filament strip of the LED filaments may have wavelengths ranging from approximately 490 nm to 450 nm. To provide "white light" a coating of phosphor in a silicone resin binder material is placed over the LEDs and glass to convert the blue light generated by the LEDs of the LED filament structure. White light is not a color, but a combination of all colors, hence white light contains all wavelengths from about 390 nm to 700 nm. Different phosphor colors can be used to change the color of the light being emitted by the LEDs. For example, the more yellow the phosphor, the more yellow and warm the light becomes. Each of the light emitting diode (LED) filament structures may have a length on the order of 4" and a width on the order of ⅛".

In some embodiments, the light source 350 can emit white light having a color temperature ranging from 1600K to 8000K. In one example, the white light emitted by the LEDs 351 may be referred to a "day white" with a temperature ranging from 3800K to 4200K. In another example, the white light emitted by the light emitting diode (LED) filament structures 50a, 50b may have a warm white light with a temperature ranging from around 2600K to 3000K. It is noted that the above examples are provided for illustrative purposes only and are not intended to limit the present disclosure.

The LEDs 351 of the light engine 350 of the lamp 500 may be selected or adjusted by the control circuit 10a to emit a specific color. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors.

The LEDs 351 of the light engine 350 of the lamp 500 may be selected or adjusted by the control circuit 10a to emit a specific color temperature. The "color temperature" of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs of the lamp 500 provided herein may emit light having the aforementioned examples of color temperatures. In some examples, the LEDs 351 of the light engine 350 of the lamp 500 are capable of adjusting the "color temperature" of the light they emit.

The LEDs 351 of the light engine 350 of the lamp 500 may be selected or adjusted by the control circuit 10a to emit a specific light intensity. In some examples, dimming or light intensity may be measured using lux. In some embodiments, the LEDs of the light engine 75 can provide lighting having an intensity between 100 lux to 1000 lux. For example, lighting 350 office work may be comfortably done at a value between 250 lux to 500 lux. For greater intensity applications, such as work areas that involve drawing or other detail work, the intensity of the lamps can be illuminated to a range within 750 lux to 1,000 lux. In some embodiments, the LEDs of the light engine 350 of the lamp 500 are capable being adjusted to adjust the light intensity/dimming of the light they emit.

In some embodiments, the LEDs 351 of the light engine 350 provide an LED load of eighteen 8.2V light emitting diodes (LEDs) that are connected in series. In some embodiments, the number LEDs 351 in the light engine 350 may range from 5 to 25, in which the LEDs are connected in series. To emit light from a light source 350 including this arrangement of LEDs 351, the driver can operate with a fairly high efficiencies under standard 120V AC input. The stabilized efficiency can be above 88%, which is higher than the efficiency of switch mode power supplies.

The light engine 350 is positioned underlying the globe 400 of the lamp 500. In some embodiments, the globe 400 is a hollow translucent component, houses the light engine 350 inside, and transmits the light from the light engine 350 to outside of the lamp 500. In some embodiments, the globe 400 is a hollow glass bulb made of silica glass transparent to visible light. The globe 400 can have a shape with one end closed in a spherical shape, and the other end having an opening. In some embodiments, the shape of the globe 400 is that a part of hollow sphere is narrowed down while extending away from the center of the sphere, and the opening is formed at a part away from the center of the sphere. In the embodiment that is depicted in FIG. 5, the shape of the globe 400 is Type A (JIS C7710) which is the same as a common incandescent light bulb. It is noted that this geometry is provided for illustrative purposes only and is not intended to limit the present disclosure. For example, the shape of the globe 400 may also be Type G, Type BR, or others. The portion of the globe 400 opposite the opening may be referred to as the "dome portion of the optic".

Referring to FIG. 5, the lamp 500 can optionally include a heatsink portion 300 configured to be in thermal communication with light engine 350 to facilitate heat dissipation for the lamp 500. To that end, optional heatsink portion 300 may be of monolithic or polylithic construction and formed, in part or in whole, from any suitable thermally conductive material. For instance, optional heatsink portion 300 may be formed from any one, or combination, of aluminum (Al), copper (Cu), gold (Au), brass, steel, or a composite or polymer (e.g., ceramics, plastics, and so forth) doped with thermally conductive material(s). The geometry and dimensions of optional heatsink portion 300 may be customized, as desired for a given target application or end-use. In some instances, a thermal interfacing layer 301 (e.g., a thermally conductive tape or other medium) optionally may be disposed between heatsink portion 300 and light engine 350 to facilitate thermal communication there between. Other suitable configurations for optional heatsink portion 300 and optional thermal interfacing layer 301 will depend on a given application.

It is noted that the structure and lamp systems of the present disclosure are not limited to only the form factor for the lamp 500 that is depicted in FIG. 5. As will be appreciated in light of this disclosure, the lamp as variously described herein may also be configured to have a form factor that is compatible with power sockets/enclosures typically used in existing luminaire structures. For example, some embodiments may be of a PAR20, PAR30, PAR38, or other parabolic aluminized reflector (PAR) configuration. Some embodiments may be of a BR30, BR40, or other bulged reflector (BR) configuration. Some embodiments may be of an A19, A21, or other A-line configuration. Some embodiments may be of a T5, T8, or other tube configuration.

In another aspect, a method of powering a lighting device is provided, in which the method can provide a lamp 500 having a low standby power, low EMI emission, low cost, low flicker percentage, and a high-power factor. Referring to FIGS. 2, 4 and 5, in one embodiment, the method includes positioning a driver circuit, e.g., linear power supply 100a, between a power source (e.g., that is engaged by the 150) and a light engine 350. The driver circuit including an input side 5 including a power input circuit 25 for communication to the power source, and an output side 10 in communication with the light engine 350. For example, the output side 10 may be in connection with the light engine 350 through an LED output circuit 90.

The method further includes controlling flickering performance by positioning an output smoothing capacitor 81 in the output side 10 of the driver circuit, wherein the input side 5 of the circuit does not include an input smoothing capacitor. The method further includes controlling current from the power source to the light engine 350 with a light emitting diode (LED) power supply circuit 15 that is present between the input side 5 and the output side 10 of the driver circuit. The light emitting diode (LED) power supply circuit 15 includes at least two linear current regulators 16a, 16b that are in parallel connection, wherein by that parallel connection the thermal load is divided between the at least two linear current regulators 16a, 16b. In some embodiments, the method can provide a lamp having a flicker percentage that is less than 30%, and having a power factor that is greater than 0.7. In some embodiments, controlling the current by the light emitting diode (LED) power supply circuit 15 can include a pulse width modulation (PWM) control signal that is fed into the input side of the circuit. In some embodiments, the method may further include filtering noise from the pulse width modulation (PWM) control signal with an EMI filter 27 positioned between the light emitting diode (LED) power supply circuit 15 and the power source, e.g., the power input circuit 25.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS.

Having described preferred embodiments of a LOW STANDBY POWER SMART BULB BASED ON A LINEAR POWER SUPPLY, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A driver circuit comprising:
an input side including a power input circuit and an output side including a light emitting diode (LED) output current circuit, wherein the output side of the driver circuit includes an output smoothing capacitor for controlling flicker percentage and providing a power factor that is greater than 0.7; and
a light emitting diode (LED) power supply circuit present between the input side and the output side of the driver circuit, wherein the light emitting diode (LED) power supply circuit is for controlling current from the power input circuit to the light emitting diode (LED) output current circuit, wherein the LED power supply circuit includes at least one linear current regulator and the driver circuit including the light emitting diode (LED) power supply circuit does not include a switch mode power supply.

2. The driver circuit of claim 1, wherein the at least one linear current regulator includes linear current regulators that are connected in parallel.

3. The driver circuit of claim 1, wherein the at least one linear current regulator includes two linear current regulators.

4. The driver circuit of claim 1, wherein an input smoothing capacitor for controlling flickering is not present in the input side of the driver circuit.

5. The driver circuit of claim 1, wherein the flickering percentage is controlled by output capacitance only via the output smoothing capacitor.

6. The driver circuit of claim 1, wherein the driver circuit when integrated into a lamp provides a flicker percentage that is less than 30%.

7. The driver circuit of claim 1 further comprising an electromagnetic interference (EMI) filter in the input side of the driver circuit.

8. The driver circuit of claim 7, wherein the electromagnetic interference (EMI) filter is present between a bridge rectifier of the power input circuit and the light emitting diode (LED) power supply circuit.

9. A lamp comprising:
a light engine for providing light;
a driver circuit including an input side having a power input circuit and an output side having an output current circuit to the light engine, wherein the output side of the driver circuit includes an output capacitor for controlling flicker percentage, and a power supply circuit present between the input side and the output side of the driver circuit, wherein the power supply circuit includes at least one linear current regulator and the light emitting diode power supply circuit is a power supply for the lamp that is in direct contact with the light engine; and
a communications module that feeds a pulse width modulation (PWM) signal to the input side of the driver circuit.

10. The lamp of claim 9, wherein the at least one linear current regulator includes linear current regulators that are connected in parallel.

11. The lamp of claim 9, wherein the at least one linear current regulator includes two linear current regulators.

12. The lamp of claim 9, wherein the light engine includes light emitting diodes to provide a light source.

13. The lamp of claim 9, wherein the flicker percentage of the lamp is less than 30%, and the power factor of the lamp is greater than 0.7.

14. The lamp of claim 9 further comprising a communications module that feeds a pulse width modulation (PWM) signal to the input side of the driver circuit.

15. The lamp of claim 9 further comprising an electromagnetic interference (EMI) filter in the input side of the driver circuit.

16. A method of powering a lamp comprising:
positioning a driver circuit between a power source and a light engine, the driver circuit including an input side including a power input circuit for communication to the power source, and an output side in communication with the light engine;
controlling flickering performance by positioning an output capacitor in the output side of the driver circuit; and
controlling current from the power source to the light engine with a light emitting diode (LED) power supply circuit present between the input side and the output side of the driver circuit, wherein the light emitting diode (LED) power supply circuit includes at least one linear current regulator and the driver circuit including the light emitting diode (LED) power supply circuit does not include a switch mode power supply, wherein said controlling the current includes a communications module that feeds a pulse width modulation (PWM) signal to the input side of the driver circuit.

17. The method of claim 16, wherein the flicker percentage of the lamp is less than 30%, and the power factor of the lamp is greater than 0.7.

18. The method of claim 16, wherein the at least one linear current regulator includes at least two linear current regulators that are connected in parallel.

19. The method of claim 18, wherein the light engine comprises light emitting diodes having a voltage load approximate to the peak voltage provided by the power source, wherein the voltage load approximate to the peak voltage reduces the voltage applied to the light emitting diode (LED) power supply circuit, wherein a reduction in the voltage applied to the light emitting diode (LED) power supply circuit reduces heat generated by the at least two linear current regulators that are in parallel connection.

\* \* \* \* \*